United States Patent Office
3,635,995
Patented Jan. 18, 1972

1

3,635,995
2-(2-IMIDAZOLIN-2-YL)METHYLTHIOPYRIDINE-
N-OXIDE AND DERIVATIVES THEREOF
Robert E. Manning, Mountain Lakes, N.J., assignor to
Sandoz-Wander, Inc., Hanover, N.J.
No Drawing. Filed Dec. 5, 1969, Ser. No. 882,707
Int. Cl. C07d 31/50
U.S. Cl. 260—294.8 G                           3 Claims

ABSTRACT OF THE DISCLOSURE

Substituted imidazoles, e.g., 2 - (2 - imidazolin - 2 - yl) methylthiopyridine - N - oxide, useful as antifungals and antibacterial agents are prepared from a halomethyl-imidazoline or halo substituted methylimidazoline and a mercaptopyridine-N-oxide derivative.

This invention relates to substituted imidazoles. More particularly, it relates to imidazoles substituted by a methylthiopyridine-N-oxide moiety, acid addition salts thereof, and to processes for their preparation.

The compounds of this invention may be represented by the formula

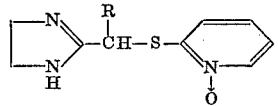

(I)

where R represents hydrogen, or

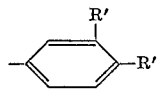

where R' represents, independently, hydrogen, halo having an atomic weight of 19–36, lower alkyl, i.e. alkyl having 1–4 carbon atoms, e.g., methyl, ethyl, isopropyl, and the like, or lower alkoxy, i.e. alkoxy having 1–4 carbon atoms, e.g., methoxy, ethoxy, butoxy and the like.

The process for preparing the compounds of Formula I may be generally represented by the following reaction scheme:

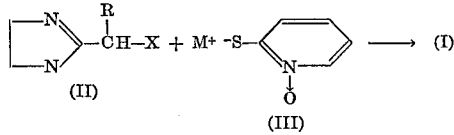

where R has the above stated significance,
X represents halo having an atomic weight of 35–80, and
M is a cation, such as an alkali metal cation, e.g. sodium or potassium.

The compounds of Formula I are prepared by treating a compound of Formula II or its acid addition salt, e.g., 2-chloromethylimidazoline hydrochloride, with a compound of Formula III, e.g., the sodium salt of 2-mercaptopyridine-N-oxide, in an inert solvent such as lower alkanol or lower alkanol in admixture with acetone, diethyl ether and the like, at a temperature from about 15° C. to the reflux temperature of the system, preferably 20°–30° C. Lower alkanols, i.e. alkanols of 1–5 carbon atoms, e.g., methanol, ethanol, propanol, isopropanol and the like are preferred as solvents. Neither the temperature of the reaction nor the solvent used is critical; conventional recovery techniques such as filtration and crystallization may be used to recover the product.

2

It should be understood that when Compound II is used in free base form, the free base of Compound I is obtained whereas the use of Compound II in the salt form provides Compounds I having one mole of salt associated with one mole of free base I. The free bases I may be prepared by conventional techniques from the acid addition salt thereof and vice versa. Representative of such salts are the mineral acid salts, e.g. sulfate or phosphate, and organic acid salts such as the acetate.

Certain of the compounds of Formulas II and III above are known and may be prepared by methods disclosed in the literature. Those not specifically disclosed are prepared from known materials in an analogous manner.

The compounds of Formula I and their acid addition salts are useful as antifungal agents as indicated by their activity at concentrations of about 3–100 micrograms/ml. in vitro against fungi such as Histoplasma capsulatum, Candida albicans and Aspergillus niger. These compounds may therefore be used to prevent fungus growth on foods such as cheese, meats, fruits, vegetables, baked goods, confections and the like, or on leather, textiles and various other materials capable of supporting fungus growth. Some of these compounds, particularly 2-[α-(2-imidazolin-2-yl)]benzylthiopyridine-N-oxide, have also been found useful at concentrations of about 10–100 micrograms/ml. in vitro against bacteria such as Staphylococcus pyogenes aureus, Escherichia coli and Proteus vulgaris and are useful as anti-bacterials. These utilities are indicated by virtue of the activity found when these compounds are tested using a conventional serial dilution test.

EXAMPLE 1

2-(2-imidazolin-2-yl)methylthiopyridine-N-
oxide hydrochloride

A mixture of 2-chloromethyl-2-imidazoline hydrochloride (7.75 g.), 2-mercaptopyridine-N-oxide sodium salt (5.15 g.), and ethanol (100 ml.) is stirred at room temperature for 64 hours. The resultant solid is collected by filtration to give 12.2 g. of solid which is triturated with methanol (150 ml.) and filtered to remove sodium chloride. The filtrate is concentrated in vacuo to a volume of 50 ml. Acetone (50 ml.) is added to provide 2-(2-imidazoline - 2-yl)methylthiopyridine-N-oxide hydrochloride; M.P. 192° dec.

EXAMPLE 2

2-[α-(2-imidazolin-2-yl)]benzylthiopyridine-
N-oxide hydrochloride

A mixture of 2-(α-chlorobenzyl)-2-imidazoline hydrochloride (6.9 g.), 2-mercaptopyridine N-oxide sodium salt, and ethanol (60 ml.) is stirred at room temperature for 48 hours. Sodium chloride is removed by filtration and the filtrate is concentrated in vacuo to 25 ml. volume. Acetone (70 ml.) is added and the resultant solid is collected. Recrystallization from methanol-acetone (1:5) gives 2 - [α - (2-imidazolin-2-yl)]benzylthiopyridine-N-oxide hydrochloride; M.P. 175–177° dec.

When the process of this example is carried out and 2-(α-p-dichlorobenzyl)-2-imidazoline hydrochloride, 2-(α-chloro-p-methoxybenzyl)-2-imidazoline hydrochloride, 2-(α,3,4-trichlorobenzyl)-2-imidazoline hydrochloride, or 2-(α-chloro-p-methylbenzyl)-2-imidazoline hydrochloride is used in place of 2-(α-chlorobenzyl)-2-imidazoline hydrochloride, there is obtained 2-[α-(2-imidazolin-2-yl)]-p-chlorobenzylthiopyridine-N-oxide hydrochloride, 2[α-(2-imidazolin - 2 - yl)] - p-methoxybenzylthiopyridine - N-oxide hydrochloride, 2-[α-(2-imidazolin-2-yl)]-3,4-dichlorobenzylthiopyridine-N-oxide hydrochloride, or 2-[α-(2-imidazolin-2-yl)]-p-methylbenzylthiopyridine-N-oxide hydrochloride, respectively.

What is claimed is:
1. A compound of the formula

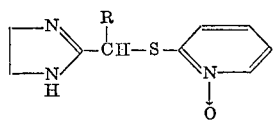

where R represents hydrogen, or

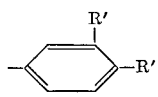

where R' represents, independently, hydrogen, halo having an atomic weight of 19–36, lower alkyl or lower alkoxy,
or an acid addition salt thereof.

2. The compound of claim 1 which is 2-(2-imidazolin-2-yl)methylthiopyridine-N-oxide.

3. The compound of claim 1 which is 2-[α-(2-imidazolin-2-yl)]benzylthiopyridine-N-oxide.

References Cited

Boyd et al., Anal. Chem., 32, pp. 551–4, 1960.
Tronche et al., Chem. Abstracts, vol. 55, 11, 396-f-h. (1961).

ALAN L. ROTMAN, Primary Examiner

U.S. Cl. X.R.

260—999